(12) United States Patent
Siahpoushan

(10) Patent No.: US 6,906,844 B1
(45) Date of Patent: Jun. 14, 2005

(54) MOUNTING SYSTEM FOR AN OPTICAL ASSEMBLY OF A PHOTOELASTIC MODULATOR

(75) Inventor: Massoud Siahpoushan, Portland, OR (US)

(73) Assignee: Hinds Instruments, Inc, Hillsboro, OR (US)

( * ) Notice: Subject to any disclaimer, the term of this patent is extended or adjusted under 35 U.S.C. 154(b) by 126 days.

(21) Appl. No.: 10/048,260

(22) PCT Filed: Jul. 25, 2000

(86) PCT No.: PCT/US00/20165

§ 371 (c)(1),
(2), (4) Date: May 22, 2002

(87) PCT Pub. No.: WO01/09670

PCT Pub. Date: Feb. 8, 2001

Related U.S. Application Data

(60) Provisional application No. 60/146,616, filed on Jul. 30, 1999.

(51) Int. Cl.[7] ............... G02F 1/11; G02F 1/33

(52) U.S. Cl. ............. 359/285; 359/286; 359/287; 359/305

(58) Field of Search ................ 359/285, 286, 359/287, 305, 364, 365, 366, 367

(56) References Cited

U.S. PATENT DOCUMENTS

| | | | |
|---|---|---|---|
| 3,495,912 A | 2/1970 | Hooper | 356/365 |
| 3,867,014 A | 2/1975 | Kemp | 359/286 |
| 5,886,810 A | * 3/1999 | Siahpoushan et al. | 359/285 |

\* cited by examiner

*Primary Examiner*—Timothy J. Thompson
(74) *Attorney, Agent, or Firm*—Ipsolon LLP

(57) ABSTRACT

An improved system for mounting an optical assembly of a photoelastic modulator (PEM) to permit free vibration of the optical assembly without introducing any stress or strain on the optical element. Moreover, the mounting system, which includes a mounting block (50), elastomeric mount (32), support flanges (36, 38), and a mounting rail (40), facilitates accurate and easy assembly of the optical element into its enclosure (26).

18 Claims, 3 Drawing Sheets

MOUNTING SYSTEM FOR AN OPTICAL ASSEMBLY OF A PHOTOELASTIC MODULATOR

This application is a 371 of PCT/US00/20165 filed Jul. 25, 2003, which claims benefit of Provisional 60/146,616, filed Jul. 30, 1999.

TECHNICAL FIELD

This invention relates to a system for mounting an optical assembly of a photoelastic modulator, thereby to facilitate efficient vibration of the optical assembly.

BACKGROUND AND SUMMARY OF THE INVENTION

A photoelastic modulator (PEM) is an instrument that is used for modulating the polarization of a beam of light. A PEM employs the photoelastic effect as a principle of operation. The term "photoelastic effect" means that an optical element that is mechanically stressed and strained (deformed) exhibits birefringence that is proportional to the amount of deformation induced into the element. Birefringence means that the refractive index of the element is different for different components of a beam of polarized light.

A PEM includes an optical element, such as fused silica, that has attached to it a transducer for vibrating the optical element at a fixed frequency within, for example, the low-frequency, ultrasound range of about 20 kHz to 100 kHz. The mass of the element is compressed and extended as a result of the vibration. The combination of the optical element and the attached transducer may be referred to as an optical assembly.

The compression and extension of the optical element imparts oscillating birefringence characteristics into the optical element the frequency of this oscillating birefringence is determined by the length of the optical element and the speed of the transducer-generated longitudinal vibration or sound wave through the material that comprises the optical element.

The effect of the oscillating birefringence of the PEM on a linear-polarized monochromatic light wave is to vary over time the phase difference between the orthogonal components of the light that propagates through the optical element. This phase difference is known as retardation or retardance and can be measured in terms of length, waves (for example, quarter-wave, half-wave), or phase angle.

The optical assembly is contained within a housing or enclosure that normally includes an aperture through which the light under study is directed through the optical element. The enclosure supports the optical assembly in a manner that permits the optical element to be driven (vibrated) within it to achieve the above noted photoelastic effect.

The optical assembly must be mounted to the enclosure in a way such that the mechanisms for mounting the optical assembly permit free vibration of the optical assembly without introducing any stress or strain on the optical element. Such stress or strain would result in undesirable changes in the birefringence characteristics of the optical element.

In the past, the optical assembly has been mounted within the enclosure with the use of elastomeric grommets or grommet-like members. The grommets were synthetic rubber, buna, or a silicon elastomer. The grommets were mounted to the enclosure on opposing sides of the optical assembly. Acrylic, cone-shaped supports were bonded to the optical assembly, and the grommets were located so that a cone-shaped support would protrude into the bore of the elastomeric grommet. Typically, the optical element was held between two opposing pairs of grommets. In other approaches, the grommets were supported on movable brackets. Once the optical assembly was in place (with the supports fit into the bore of the grommets), the brackets that hold the grommets were fastened to the enclosure.

The prior technique for mounting the optical assembly to the enclosure is generally effective but has at least one drawback. Specifically, the use of the somewhat rigid, cone-shaped supports has deleterious effects on the overall performance quality factor, or "Q" value, of the photoelastic modulator. In this regard, "Q" is defined as the ratio of the energy stored in a system to the energy lost per cycle. The higher the "Q," the more efficient the system. The rigid supports tend to dampen the vibration of the optical element, thus requiring more drive energy to maintain the desired vibrational frequency of the element. Increasing drive energy increases the heat generated within the photoelastic modulator, which causes a reduction in the Q value.

The present invention provides an improved system for mounting an optical assembly of a PEM to permit free vibration of the optical assembly without introducing any stress or strain on the optical element. Moreover, the mounting system facilitates accurate and easy assembly of the optical element into its enclosure.

The system includes an array of generally flexible, single-piece mount components that are connected between the optical element and the enclosure. Moreover, the contact surface of the mount (that is, the surface that is bonded to the optical element) is shaped to reduce the amount of contact between the mount and optical element with respect to the direction of vibration of the element. As a result, the "Q" value of the optical assembly employing the flexible, single-piece system of the present invention is greater than one employing the two-component (support and grommet) approach to mounting an optical assembly as described above.

As another aspect of this invention the mounted optical assembly is reliably attached to the enclosure, and able to withstand severe jarring of the PEM without failure of the mounting.

As another approach to mounting the optical assembly to permit its free vibration, a PEM is configured to reduce what is characterized as "residual" birefringence that may be attributable to supporting the optical element of the PEM in the enclosure. In this regard, the optical element is bonded at each end to a transducer. Each transducer is mounted to the PEM enclosure in accordance with the present invention. The mounting system also includes a specially shaped mount that has edges that abut the optical element, but are not bonded to that element. As a result, the optical element is essentially suspended, thus free from any residual birefringence that may be attributable to directly mounting the oscillating optical element to the enclosure. The specially configured version of the mount, however, secures that optical element against unwanted movement out of the direction that the element oscillates.

Other advantages and features of the present invention will become clear upon study of the following portion of this specification and drawings.

BEST MODES FOR CARRYING OUT THE INVENTION

Figure 1:
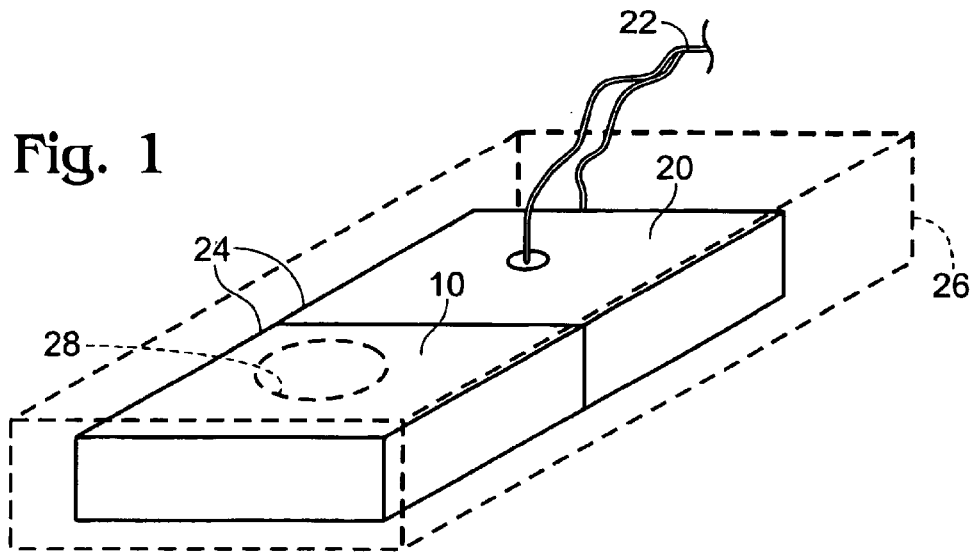
FIG. 1 is a perspective view of a photoelastic modulator, showing the optical assembly in solid lines and an enclosure in dashed lines for illustrative purposes.

FIG. 1 depicts the primary components of a photoelastic modulator, including an optical element 10 formed of fused silica. Other material, such as fused quartz calcium fluoride, zinc selenide, silicon and others may be used to form the optical element.

The optical element 10 is an elongated bar having an entry surface 12 (FIG. 2) against which an incident light wave is directed while the photoelastic modulator is operating. (Other optical element shapes will be acceptable, such as the symmetrical shape depicted in U.S. Pat. No. 3,867,014 to Kemp). A quartz, piezoelectric transducer 20 is bonded to one end of the optical element 10. Electrical leads 22 from the transducer are connected to a driver circuit (not shown) for vibrating the optical element 10. The driver circuit may be tuned to drive the fused-silica element 10 to vibrate at its natural resonant frequency, typically about 50 kHz.

The optical element 10 and transducer 20 (hereafter collectively referred to as the optical assembly 24) are contained within a housing or enclosure 26. The enclosure includes a bottom part 27 that is formed from thin-walled sheets of rigid metal defining a tray shape. (It is noteworthy here that the terms "top" or "bottom" are intended to designate components for illustrative purposes, and not suggest that such components are limited to a particular orientation in space.) A rigid, metal cover 29, which is substantially a mirror image of the bottom 27 of the enclosure is fit over the bottom to define that space between the cover and bottom in which the optical assembly is enclosed.

The enclosure includes an aperture 28 (FIG. 2) through which light is directed to propagate through the vibrating optical element 10. The light that emanates from the element 10 is then detected and analyzed.

The optical assembly 24 is housed within the enclosure so that it is free to vibrate when driven as described above. In this regard, and in accordance with the present invention, the optical assembly 24 is suspended within the enclosure.

Figure 2:
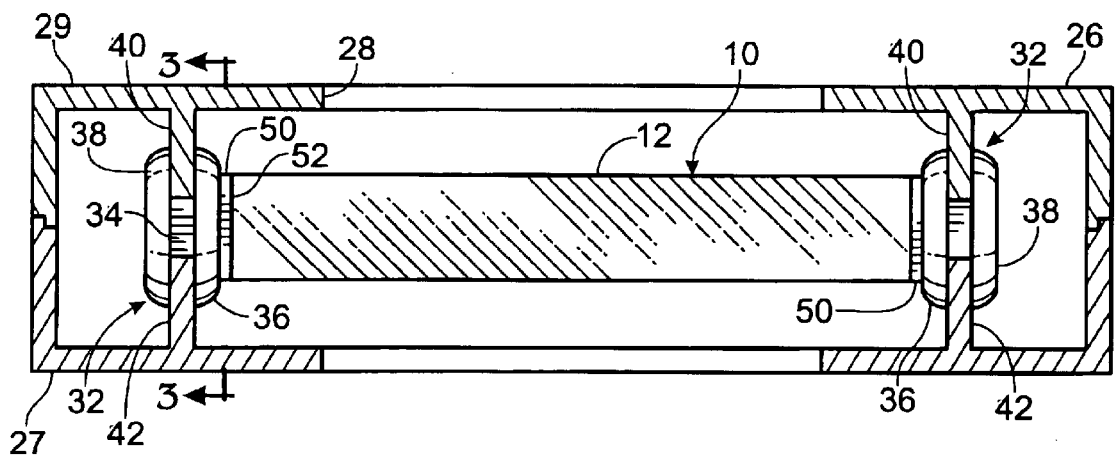
FIG. 2 is an end view, partly cut away, of a preferred embodiment of the present invention.
Figure 3:
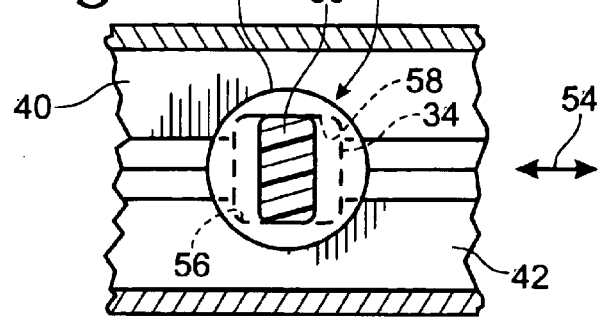
FIG. 3 is a cross sectional view taken along line 3—3 of FIG. 2.
Figure 4:
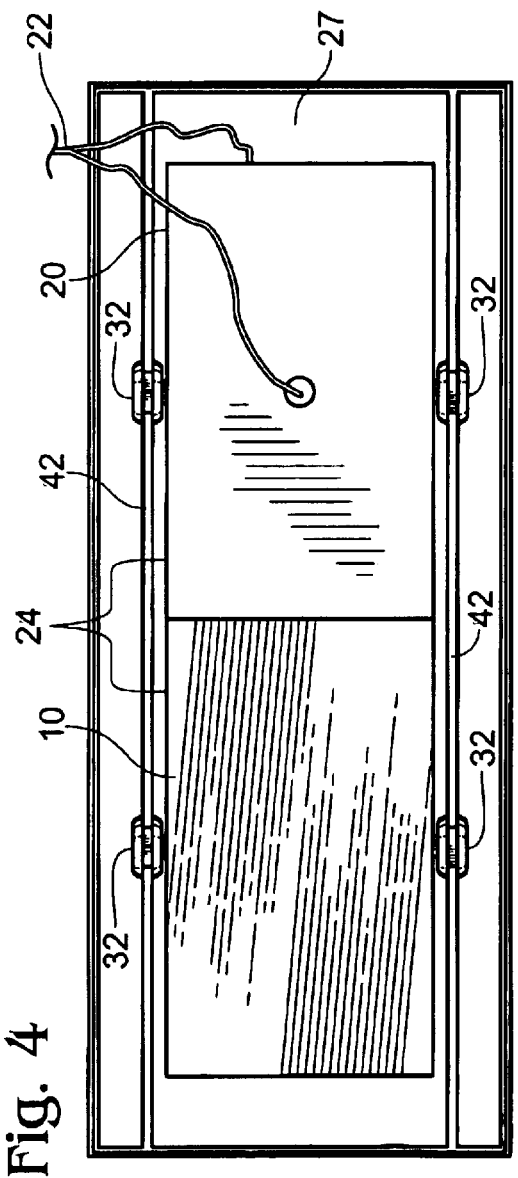
FIG. 4 shows in top view the preferred mounting system of the present invention, with the cover part of the enclosure removed.

As best shown in FIGS. 2–4, the mounting system of the present invention includes elastomeric mounts 32 that are preferably formed of injection-molded silicone having a durometer value in the range of 55–60. Each mount 32 is a single piece and includes a cuboidal or block shaped body 34.

Disc-shaped support flanges 36, 38 are present on opposite sides of the mount body 34. The diameter of the flanges (measured in the vertical direction in FIG. 2) is greater than the height of the body (measured in the vertical direction in FIG. 2) and width of the body (measured perpendicular to the plane of FIG. 2). As a result, there is defined between the two flanges 36, 38 a gap into which fit a top mounting rail 40 and bottom mounting rail 42 which extend from the enclosure bottom 27 and cover 29, respectively, to carry the mounts 32 as described more below.

As depicted in FIG. 4, four mount arrangements are employed: one pair of opposing mounts 32 attached to the transducer 20, and another pair of opposing mounts 32 attached to the optical element 10. The mounts 32 are located at the respective centers of the length of the optical element 10 and transducer 20 where a vibrational node point exists while the assembly is driven.

Each mount 32 includes a mounting block 50 that protrudes from one of the flanges 36. In this embodiment, the block is rectangular shaped as best seen in FIG. 3. The surface 52 (FIG. 2) of the block 50 is bonded to the side of the optical element 10 (or transducer 20, as the case may be) with a suitable adhesive, such as the RTV silicon sealant from Dow Corning.

As noted, the surface 52 of the block 50 is rectangular. In a preferred embodiment, the block is oriented so that the smaller dimension (width) of that surface is oriented to be parallel with the direction of vibration of the element (optical element 10 or transducer 20) to which it is attached. In FIG. 3, for instance, that direction is in a horizontal line 54. This orientation of the block surface 52 tends to reduce the amount of contact between the mount and optical element with respect to the direction of vibration of the element. As a result, damping (and the consequent reduction in Q value) is minimized, while yet preserving an adequate amount of area in the surface 52 to ensure that the bond between the block and element remains strong.

After the mounts 32 are bonded to the optical element as described above, this assemblage is inserted into the bottom 27 of the enclosure such that the cuboidal body 34 of each mount 32 firmly slides into a correspondingly shaped recess 56 that is formed in the uppermost edge of the upwardly protruding bottom rail 42 of the enclosure bottom 27 (see FIG. 3). The recess in the bottom rail is not deeper than one-half the length of the body 34 (measured vertically in FIG. 3). As a result, a portion of the body extends above the bottom rail 42 to be captured in a recess 58 made in the top rail 40 of the enclosure cover 29 to substantially match the recess 56 in the bottom rail 42.

As a result, once the optical assembly 24 is properly located in the bottom 27 of the enclosure 26 (that is, the body 34 of each mount 32 being slid or nested in a recess 56 in the bottom rail 42) the cover 29 of the enclosure is moved into place above the bottom 27 as shown in FIG. 2, so that the optical assembly is captured by and suspended within the enclosure. The top and bottom of the enclosure are joined by any suitable fastening means.

In a preferred embodiment, the injection molding tolerances are very small, so that the surface 52 of the mount block 50 is in a plane and so that once bonded to the optical assembly, and captured between the rails 40, 42, the entry surface 12 of the optical element will be secured in an orientation precisely parallel to the central axis of the aperture 28, thereby to ensure that an incident light wave passes into the surface 12 in a perpendicular relationship to that surface. Also, the blocks 50 are sized so that when the mounts 32 are secured in the enclosure the mounting surface 52 precisely abuts (without compression or extension) the optical assembly 12.

As an alternative assembly technique, the entire optical assembly could be included in the injection molding process so that the ends defining the surfaces 52 of the mounting blocks 50 flow into contact with the optical assembly and bond directly thereto in the absence of any adhesives.

Figure 5:
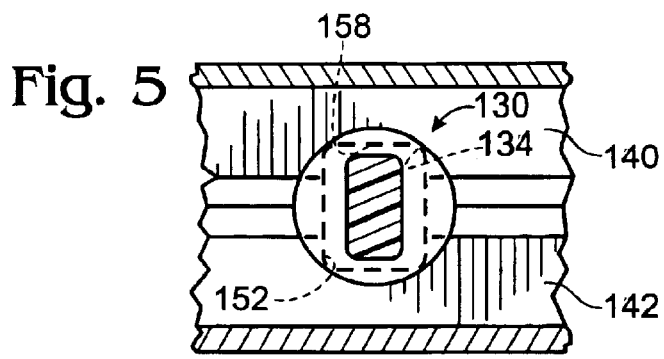
FIG. 5 is a cross sectional view, like FIG. 3, but showing an alternative embodiment of a mount of the present invention.

As noted, it is preferred to ensure that the mounting block 50 is attached to the optical element so that its width is parallel to the vibration direction 54 of the optical assembly. In an alternative embodiment of the present invention (FIG. 5), the body 134 of a mount 130 is also rectangular shaped. Also, the recess 152 in the bottom rail 142, as well as the recess 158 in the top rail 140, is made to match the width of the body 134. This has a keying effect that ensures that an optical assembly will not properly engage an enclosure unless the mounts are correctly oriented.

The figures of the just-described embodiment show the top and bottom rails 40, 42 as continuous members extending across the entirety of the associated top 29 or bottom 27 of the enclosure. It will be appreciated, however, that the rails may be discrete components, just long enough to support the mount 32, and not necessarily a continuous member.

As noted above, a PEM may be configured to reduce the residual birefringence that may be attributable to supporting the optical element of the PEM in the enclosure. Such a configuration is depicted in FIG. 6.

Figure 6:
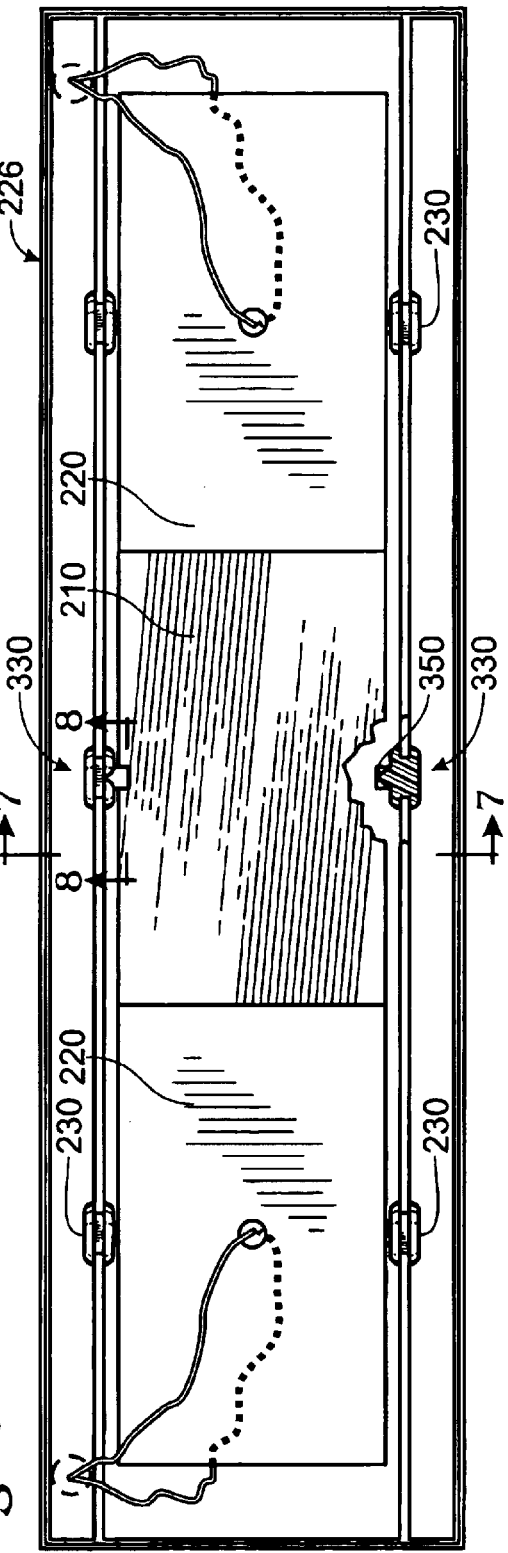
FIG. 6 shows in top view another preferred mounting system of the present invention.

In the embodiment of FIG. 6, the optical element 210 is bonded at each end to a transducer 220. Each transducer is mounted to the PEM enclosure 226 in accordance with the present invention. That is, a pair of opposing mounts 230 are bonded to the transducers 220. These mounts 230 are configured, arranged and attached in a manner corresponding to the mounts 32 described above.

This embodiment of the mounting system also includes a specially shaped guide mount 330 that has edges that abut the optical element, but are not bonded to that element. As a result, the optical element 210 is essentially suspended, thus free from any residual birefringence that may be attributable to directly mounting the oscillating optical element to the enclosure 226. The guide mount 330, however, secures that optical element against unwanted movement out of the direction that the element oscillates.

Figure 7:
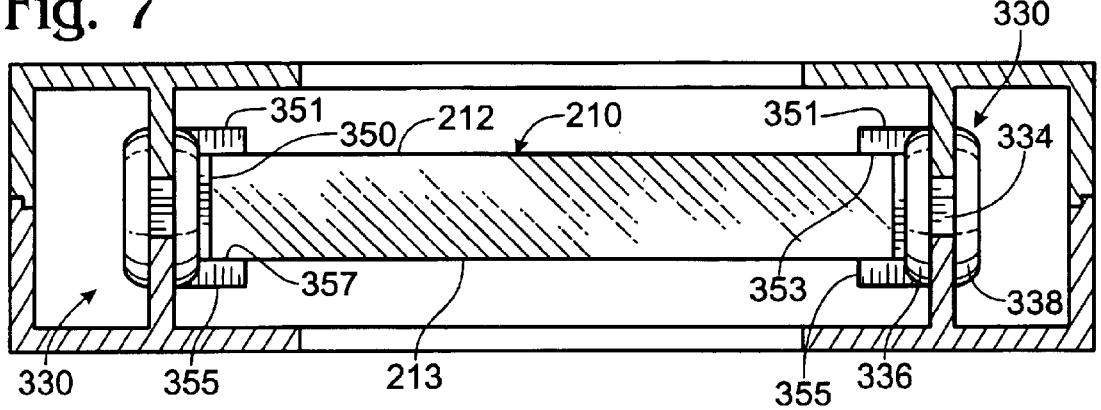
FIG. 7 is a cross sectional view taken along line 7—7 of FIG. 6.
Figure 8:
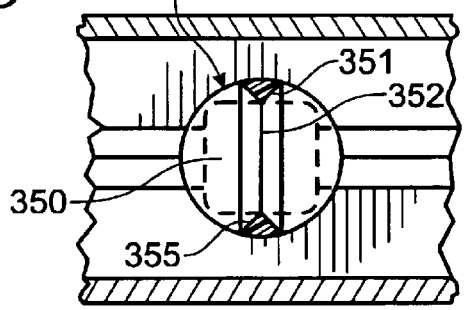
FIG. 8 is a cross sectional view taken along line 8—8 of FIG. 6.

As shown in FIGS. 6–8, each guide mount 330 includes a body 334 with opposing flanges 336, 338 that generally match the body 34 and flanges 36, 38 of the above described embodiment. Instead of a mounting block, however, the guide mount 330 has an inwardly protruding vertical side blade 350 that is triangular in cross section and tapers to an edge 352 that just abuts (without compression of the blade 350) the side of the optical element 210.

A top blade 351 is also part of the guide mount 330 and extends from the flange 336 over the surface 212 of the optical element. This top blade 351 tapers to an edge 353 that just abuts (without compression of the blade 351) the top surface of the optical element 210.

A bottom blade 355 is also part of the guide mount 330 and extends from the flange 336 beneath the bottom surface 213 of the optical element. This bottom blade 355 tapers to an edge 357 that just abuts (without compression of the blade 355) the bottom surface 213 of the optical element 210.

Figure 9:
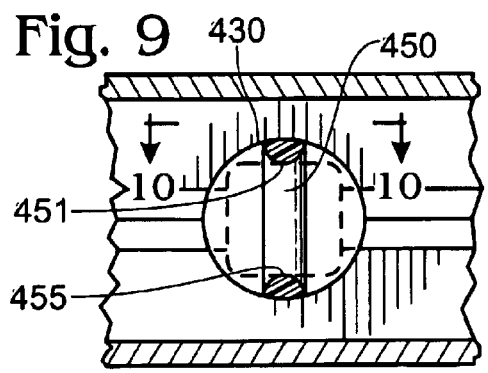
FIG. 9 is a cross sectional view, like FIG. 8, but showing an alternative configuration of a mount of this embodiment.
Figure 10:
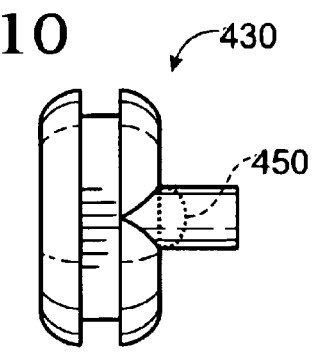
FIG. 10 is a view taken along line 10—10 of FIG. 9.

The guide mount just described need not have "sharp" edges on the blades that abut the optical element. In this regard, an alternative embodiment of this mount 430 is shown in FIGS. 9 and 10. This version of the guide mount 430 is substantially identical to the mount 330 described above except that the vertical or side blade 450 has a rounded edge, which, in some instances will be less inclined to wear as compared to sharp edges.

The vertical blade 450 may terminate, for example, in a 0.78 inch-radius rounded edge when used with a 0.25 inch-thick optical element. As before, that edge abuts the side of the optical element 210, without compression.

Similarly, the top blade 451 of this embodiment has a rounded edge (0.125-inch radius in this example), and the bottom edge 455 is similarly rounded.

In another preferred embodiment, the mount 330 described with respect to FIGS. 6–8 (as well as the variation 430 of FIGS. 9 and 10) could be substituted for the mounts 32 that are, in the FIG. 4 embodiment, mounted adjacent to the optical element 10. As a result, the transducer 20 would be supported by the bonded mounts 32 and the optical element 10 would be supported and guided by the mount 330 or 430.

What is claimed is:

1. A mount for a photoelastic modulator optical assembly that has an optical element that vibrates in a first direction within an enclosure, comprising:

a body that is shaped to fit into a correspondingly shaped groove in the enclosure; and a pair of spaced apart elastomeric blades shaped to protrude from the body and extend across opposite surfaces of the optical element to resist movement of the optical element out of the first direction.

2. The mount of claim 1 wherein the blades abut without attachment to the optical element, thereby to allow movement of the optical element in the first direction relative to the blades.

3. A mount for a photoelastic modulator optical assembly that has an optical element that vibrates in a first direction within an enclosure, comprising:

a body that is shaped to fit into a correspondingly shaped groove in the enclosure;

a pair of spaced apart blades shaped to protrude from the body and extend across opposite surfaces of the optical element to resist movement of the optical element out of the first direction; and a third blade extending between and perpendicular to the pair of blades and protruding from the body to extend into abutting contact with the optical element for resisting movement of the optical element out of the first direction.

4. The mount of claim 3 wherein the third blade abuts without attachment to the optical element, thereby to allow movement of the optical element in the first direction relative to the pair of blades and the third blade.

5. The mount of claim 1 wherein the blades are each tapered to an edge that abuts the optical element.

6. The mount of claim 5 wherein the edges of the blades are rounded.

7. A mount for photoelastic modulator optical assembly that has an optimal element that vibrates in a first direction within an enclosure comprising:

a body that is shaped to fit into a correspondingly shaped groove in the enclosure;

a pair of spaced apart blades shaped to protrude from the body and extend across opposite surfaces of the optical element to resist movement of the optical element oat of the first direction; and further comprising a pair of flanges adjacent to the body.

8. The mount of claim 1 wherein the body is formed of elastomeric material.

9. The mount of claim 1 formed to be a unitary member of injection-molded elastomeric material.

10. A system for mounting within a rigid enclosure a photoelastic modulator optical assembly that has a transducer comprising:

an optical element connected to the transducer to vibrate in a first direction within an enclosure;

a guide mount having a body that is shaped to fit into a correspondingly shaped groove in the enclosure and a pair of spaced apart blades shaped to protrude from the body and extend across opposite surfaces of the optical element to resist movement of the optical element out of the first direction; and wherein the blades abut without attachment to the optical element, thereby to allow movement of the optical element in the first direction relative to the blades; and a flexible support mount attached to the optical assembly and connected to the enclosure for supporting the transducer to be suspended within the enclosure.

11. A system for mounting within a rigid enclosure a photoelastic modulator optical assembly that has an transducer connected to an optical element that vibrates in a first direction within an enclosure, comprising:

a guide mount having a body that is shaped to fit into a correspondingly shaped groove in the enclosure and a pair of spaced apart blades shaped to protrude from the body and extend across opposite surfaces of the optical element to resist movement of the optical element out of the first direction; and a flexible support mount attached to the optical assembly and connected to the enclosure for supporting the transducer to be suspended within the enclosure;

wherein the support mount includes a surface that is attached to the transducer, the surface having an area defined by two dimensions, one of which dimensions is smaller than the other dimension, and wherein the smaller dimension is oriented to be substantially parallel to the first direction.

12. A method of mounting an optical assembly of a photoelastic modulator in an enclosure, wherein the optical assembly includes an optical element that vibrates in a first direction and that has two opposing ends, each end having a transducer bonded thereto, the method comprising the steps of:

attaching flexible mount members to both transducers wherein each flexible mount member includes a surface that is attached to a transducer, the surface having an area defined by two dimensions, one of which dimensions is smaller than the other dimension and wherein the attaching step includes orienting the smaller dimension to the substantially parallel to the first direction; and suspending the photoelastic modulator in the enclosure by attaching the mount members to the enclosure in a manner such that the transducers are spaced from the enclosure.

13. The method of claim 12 including the step of attaching to the enclosure guide mounts that extend into abutting contact with the optical element to resist movement of the optical element out of the first direction.

14. The method of claim 13 including the step of tapering the guide mounts to define edges that abut the optical element.

15. The method of claim 14 including the step of rounding the edges of the guide mounts.

16. The method of claim 13 including the step of forming each mount member and guide mount to be a unitary elastomeric member.

17. The method of claim 13 including the step of arranging the guide mounts so that the edges are not attached to the optical element, thereby to allow movement of the optical element in the first direction relative to the guide mounts.

18. The method of claim 13 including the step of locating the mount members and guide mounts at vibrational node points of the optical assembly.

* * * * *